Sept. 16, 1952 R. OSBORN ET AL 2,610,431
RAT OR MOUSE TRAP
Filed Jan. 16, 1948

Inventors
Ralph Osborn
Daisy Osborn

By *Randolph & Beavers*
Attorneys

Patented Sept. 16, 1952

2,610,431

UNITED STATES PATENT OFFICE 2,610,431

RAT OR MOUSE TRAP

Ralph Osborn and Daisy Osborn,
National City, Calif.

Application January 16, 1948, Serial No. 2,703

1 Claim. (Cl. 43—81)

The present invention relates to a rat or mouse trap and it consists in the combinations, constructions and arrangements of parts herein described and claimed.

It is an object of the present invention to provide a mouse trap or rat trap which is simple and inexpensive in construction and efficient and effective in use.

Another object of the invention is the provision of a mouse or rat trap which is provided with a platform operated trigger.

A further object of the invention is the provision of a rat or mouse trap having a combined platform and bait holding shelf for cooperatively operating a trigger associated with said trap.

Another object of the invention is the provision of a novel bait holding tube.

A further object of the invention is the provision of a trap in which the bait cannot be carried away by the animal for whom the trap is set.

A further object of the invention is the provision of a rat or mouse trap in which the animal is always securely caught.

Other and further objects of the invention will become apparent from a reading of the following specification taken in conjunction with the drawing, in which.

Figure 1:
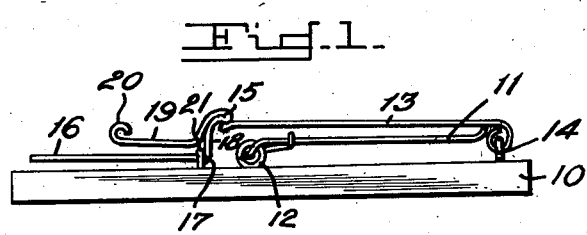
Figure 1 is a side elevational view of an embodiment of the invention.

Generally, there is provided a rat or mouse trap having a conventional rectangular wooden base to which is affixed the customary spring operated tripping bar and having a trigger mechanism comprising a platform covering a large portion of the base and an integrally formed bait shelf, the outer end of which is bent to form a tube for the securing of bait therein. The platform and shelf are so arranged that an animal attempting to secure the bait must of necessity place either or both of his forefeet upon the platform. Downward movement of the platform will release the shelf or the bait holder and the trigger and cause the tripping bar to entrap the animal.

Referring more particularly to the drawing, there is shown therein a rat or mouse trap having a rectangular base 10, preferably formed of wood, to which is pivotally mounted a striking bar 11 by means of a pair of staples 12 affixed in the base.

A trigger bar 13 is pivotally connected to the forward end of the base 10 by means of a staple 14 affixed to said base and extends rearwardly to engage a lip 15 formed in a trigger mechanism comprising a platform 16 which extends over a large area of the rear of the base and which is formed with a transversely extending dependent groove 17 at its forward end with which is integrally formed an upwardly extending arm 18 provided with converging sides the uppermost end of which forms a part of the lip 15.

A bait shelf 19 is formed integrally with the lip 15 and extends rearwardly and has its free end bent to form a substantially cylindrical bait holder 20. It will be understood that the platform 16, the grooved portion 17, the arm 18, the lip 15, the shelf 19 and the bait holder 20 are all formed of a single piece of material. The member 19 is disposed in substantially parallel relation to the member 16.

A staple 21 having an elongated head is adapted to lie within the groove 17 to hold the trigger mechanism in position.

Figure 2:
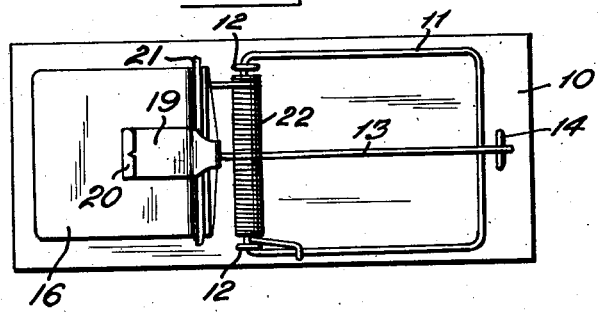
Figure 2 is a plan view thereof.
Figure 3:
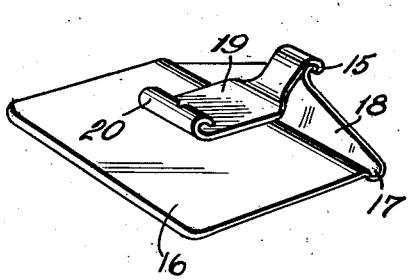
Figure 3 is an enlarged perspective view illustrating certain elements of the invention.

In operation, it will be apparent that to set the trap the striking bar is placed in its forward position, as shown in Figures 1 and 2 against the action of the conventional spring 22. The trigger bar is then rotated rearwardly to the position it is shown as having in Figures 1 and 2 and it is then engaged with the lip 15. Bait may be placed upon the shelf 19 or it may be forced into the interior of the cylinder or tube 20. A rat or mouse seeking the bait must place one or both of its forefeet upon the platform 16 in order to reach the bait with its head, thus providing additional weight upon the trigger mechanism and making doubly sure that the trigger bar is released thereby to spring the trap. Of course, if the animal should accomplish the reaching of the bait without placing any weight upon the platform 16, he would still trip the lip 15 from the trigger bar 13 by muzzling against the bait upon the platform 19 or in the tube 20. It will also be understood that bait placed within the tube 20 cannot be stolen from the trap by a rat or mouse without releasing the trigger mechanism.

While but one form of the invention has been shown and described herein, it will be readily apparent to those skilled in the art that many minor modifications may be made without departing from the spirit of the invention or the scope of the appended claim.

What is claimed is:

A trap of the character described comprising a rectangular base, a spring-actuated striking bar pivoted to said base, a trigger bar pivoted to the base and adapted to hold the striking bar under tension, a platform having a transverse groove adjacent its inner end, an arm formed integrally with the inner end of said platform and having upwardly and inwardly converging sides, a shelf formed integrally with said arm and extending in spaced substantially parallel relation to said platform to a point above the approximate center of said platform, a lip for engaging the free end of the trigger bar formed by the adjoining areas of said platform and said shelf, a substantially cylindrical bait holder integrally formed in the free end of said shelf, and a U-shaped staple engaged in said base and having an elongated bight portion positioned in said groove.

RALPH OSBORN.
DAISY OSBORN.

REFERENCES CITED

The following references are of record in the file of this patent:

UNITED STATES PATENTS

| Number | Name | Date |
|---|---|---|
| 615,219 | Hotchkiss | Nov. 29, 1898 |
| 1,464,559 | Britan | Aug. 14, 1923 |
| 1,507,532 | Vickers | Sept. 2, 1924 |

FOREIGN PATENTS

| Number | Country | Date |
|---|---|---|
| 100,692 | Australia | Apr. 1, 1937 |
| 570,386 | Great Britain | July 4, 1945 |